(12) United States Patent
Maxwell et al.

(10) Patent No.: US 8,021,900 B2
(45) Date of Patent: Sep. 20, 2011

(54) PLANAR WAVEGUIDE WITH PATTERNED CLADDING AND METHOD FOR PRODUCING SAME

(75) Inventors: Ian Andrew Maxwell, Five Dock (AU); Dax Kukulj, Summer Hill (AU); Robert Bruce Charters, Palmerston (AU)

(73) Assignee: RPO Pty Limited, Acton, Act (AU)

( * ) Notice: Subject to any disclaimer, the term of this patent is extended or adjusted under 35 U.S.C. 154(b) by 284 days.

(21) Appl. No.: 11/693,357

(22) Filed: Mar. 29, 2007

(65) Prior Publication Data

US 2007/0287212 A1 Dec. 13, 2007

Related U.S. Application Data

(62) Division of application No. 10/694,928, filed on Oct. 27, 2003, now Pat. No. 7,218,812.

(51) Int. Cl.
*H01L 21/00* (2006.01)
(52) U.S. Cl. ........ 438/22; 438/27; 438/31; 257/E21.024
(58) Field of Classification Search ............... 438/31, 438/27, 22, 32; 257/E21.024
See application file for complete search history.

(56) References Cited

U.S. PATENT DOCUMENTS

| | | | |
|---|---|---|---|
| 4,262,996 A | 4/1981 | Yao | |
| 4,367,916 A | 1/1983 | Mottier et al. | |
| 4,440,468 A | 4/1984 | Auracher et al. | |
| 4,445,759 A | 5/1984 | Valette | |
| 5,253,319 A | 10/1993 | Bhagavatula | |
| 5,265,177 A | 11/1993 | Cho et al. | |
| 5,352,566 A | 10/1994 | Springer et al. | |
| 5,432,877 A | 7/1995 | Sun et al. | |
| 5,612,171 A | 3/1997 | Bhagavatula | |
| 5,719,973 A | 2/1998 | Monroe et al. | |
| 5,850,498 A | 12/1998 | Shacklette et al. | |
| 6,037,105 A | 3/2000 | You et al. | |
| 6,256,441 B1 * | 7/2001 | Ogawa | 385/129 |
| 6,341,189 B1 | 1/2002 | Deacon | |
| 6,555,288 B1 * | 4/2003 | Xu et al. | 430/270.1 |
| 6,785,458 B2 | 8/2004 | Mule et al. | |
| 6,807,352 B2 | 10/2004 | Mule et al. | |
| 6,832,036 B2 | 12/2004 | Ghoshal et al. | |
| 7,218,812 B2 | 5/2007 | Maxwell et al. | |
| 2002/0076188 A1 | 6/2002 | Kimerling et al. | |

(Continued)

FOREIGN PATENT DOCUMENTS

| | | |
|---|---|---|
| EP | 1 058 135 A1 | 12/2000 |
| EP | 1 181 591 B1 | 2/2002 |
| JP | 57114109 A | 7/1982 |
| JP | 59065808 A | 4/1984 |
| JP | 07-35933 | 2/1995 |
| JP | 2000-39531 | 2/2000 |

(Continued)

OTHER PUBLICATIONS

Supplementary European Search Report (Jul. 30, 2009) corresponding to European Application No. 04 76 1436.

*Primary Examiner* — Michael Trinh
(74) *Attorney, Agent, or Firm* — Miller, Matthias & Hull, LLP

(57) ABSTRACT

Methods for the production of integrated optical waveguides which have a patterned upper cladding with a defined opening to allow at least one side or at least one end of a light transmissive element to be air clad The at least one side or at least one end is, for preference, a lens structure unitary with the waveguide or a bend.

45 Claims, 8 Drawing Sheets

U.S. PATENT DOCUMENTS

| | | | |
|---|---|---|---|
| 2002/0118907 A1* | 8/2002 | Sugama et al. | 385/14 |
| 2002/0122648 A1 | 9/2002 | Mule et al. | |
| 2002/0136481 A1 | 9/2002 | Mule et al. | |
| 2003/0035632 A1* | 2/2003 | Glebov et al. | 385/43 |
| 2005/0089298 A1 | 4/2005 | Maxwell et al. | |
| 2005/0201681 A1 | 9/2005 | Payne | |

FOREIGN PATENT DOCUMENTS

| | | |
|---|---|---|
| JP | 2000-039531 | 2/2000 |
| JP | 2002-107559 | 4/2002 |
| JP | 2004-125899 | 4/2004 |
| WO | WO-02/33457 | 4/2002 |

* cited by examiner

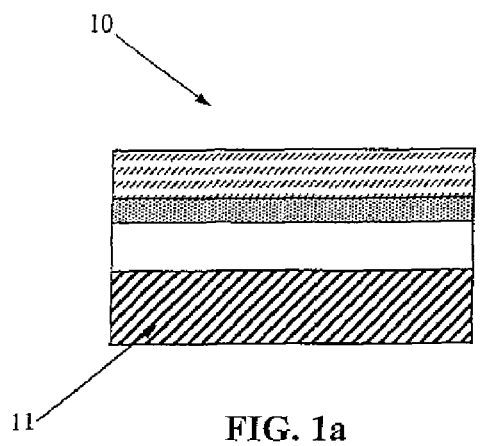
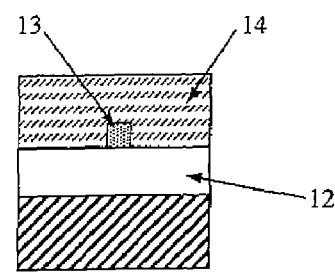
FIG. 1a    FIG. 1b
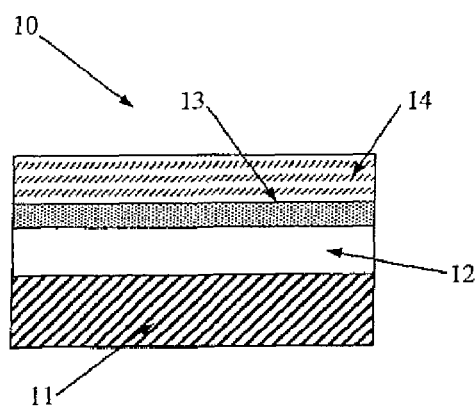
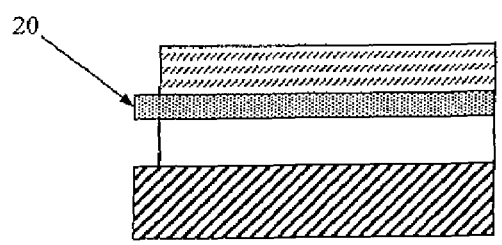
FIG. 2a    FIG. 2b
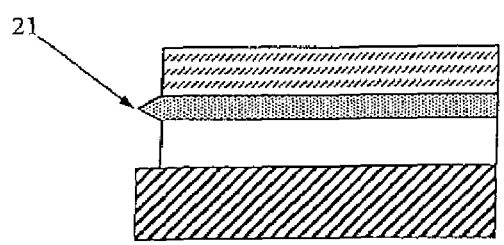
FIG. 2c

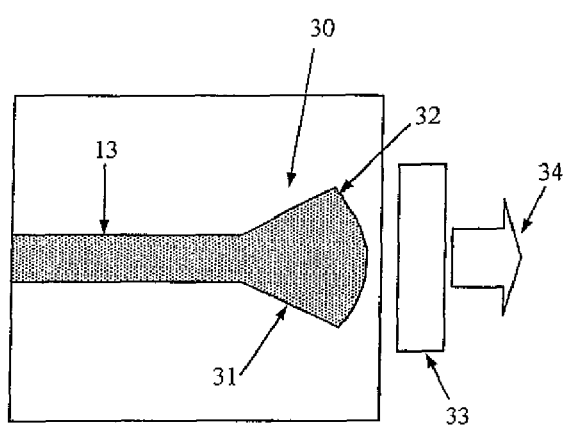
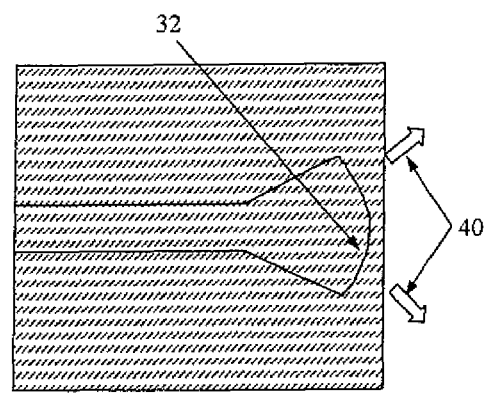
FIG. 3a                    FIG. 4a
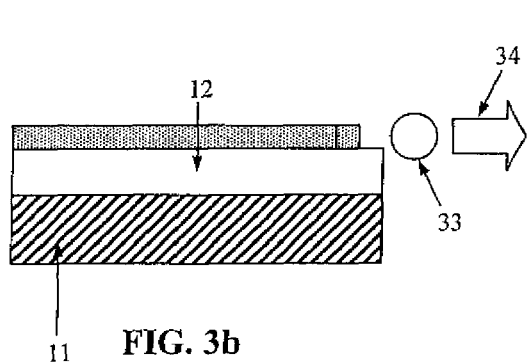
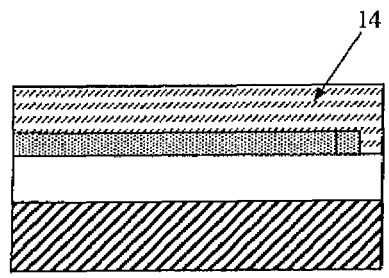
FIG. 3b                    FIG. 4b

PLANAR WAVEGUIDE WITH PATTERNED CLADDING AND METHOD FOR PRODUCING SAME

CROSS-REFERENCE TO RELATED APPLICATION

This application is a divisional of U.S. patent application Ser. No. 10/694,928, filed on Oct. 27, 2003, now U.S. Pat. No. 7,218,812, and claims the priority thereof under 35 USC §121.

FIELD OF THE INVENTION

The invention relates to an integrated optical waveguide with a patterned upper cladding, and to methods for patterning the upper cladding.

BACKGROUND OF THE INVENTION

Integrated optical waveguides typically consist of a patterned, light guiding core layer (of refractive index $n_1$) surrounded by a cladding material (of refractive index $n_2$, where $n_2 < n_1$) and mounted on a mechanically robust substrate. These waveguides generally have flat end faces, often produced by cutting the substrate and waveguide structure with a dicing saw, followed by a polishing step to remove scattering centres. Light propagating along the waveguide is guided within the core by the refractive index difference between core and cladding.

Referring to the drawings, FIGS. 1a and 1b show side and end views of the end face of a typical integrated optical waveguide 10 as known in the art, comprising a substrate 11, a lower cladding layer 12, a light guiding core 13 and an upper cladding layer 14. Depending on the material system, a variety of techniques ate available for depositing the lower cladding, core and upper cladding layers. These include flame hydrolysis or chemical vapour deposition (e.g. for glass), molecular beam epitaxy (e.g. for semiconductors) and spin coating (e.g. for polymers) The core layer can be patterned either by photolithography and reactive ion etching (suitable for most materials) or by photolithography and wet etching (e g. for photo-patternable polymers). The refractive index of the lower 12 and upper 14 cladding layers needs to be less than that of the core 13, so that light is confined within the core. Often, the lower 12 and upper 14 cladding layers have the same refractive index, so that the guided mode is symmetric, although this is not necessary. If the substrate material 11 is transparent and has refractive index lower than the core material 13, the lower cladding 12 may be omitted.

Typically, planar waveguides have a light transmissive elongated core region which is square or rectangular in cross section. The bottom face is conventionally defined as that being adjacent or nearest the substrate. The top face is the face parallel to the bottom face but furthest from the substrate. The sides are those faces which are perpendicular to the substrate.

In this integrated optical waveguide previously described in the art, the core is surrounded by cladding material, either the lower cladding or the upper cladding However this need not necessarily be the case, and there are some applications where it is advantageous for at least one portion of the core to be free of contact with cladding material on at least one side. Accordingly, one aspect of the present invention concerns integrated optical waveguides where the upper cladding layer is patterned such that in at least one region, at least one side of the core is free of contact with the upper cladding material Patterned upper claddings have been disclosed in U.S. Pat. No. 5,850,498 and U.S. Pat. No. 6,555,288, for reducing the stress in a waveguide core In these disclosures, where the patterned upper cladding is described as "conformal", the upper cladding has a shape substantially congruent with the shape of the core, in other words the core is enclosed (except the bottom, which is in contact with the substrate or lower cladding material) with a thin layer of upper cladding material. This is distinct from the patterned upper cladding of the present invention, where the upper cladding layer is patterned such that in at least one region, at least one side of the core is free of contact with the upper cladding material.

One application where it is advantageous for at least one region of the core to be free of contact with cladding material on at least one side is an integrated optical waveguide with a unitary lens structure. As mentioned above, light is guided along an integrated optical waveguide by the refractive index difference between the core and cladding layers However when the light exits the core into free space (or air in practice) it immediately diverges. This divergence occurs in two dimensions, parallel and perpendicular to the substrate. If a collimated output beam is desired, some sort of positive (i.e. converging) lens is required. Equivalently, a converging lens is required to focus a collimated beam into an integrated optical waveguide.

One solution is to use a discrete element such as a ball lens or a cylindrical gradient refractive index (GRIN) lens, however such lenses are difficult to handle because of their small size, require precise alignment in two dimensions, and introduce additional interfaces (with inherent reflection losses). It is preferable therefore to integrate the lens structure with the optical waveguide. Many types of integrated lenses have been proposed over the years, including Fresnel lenses (U.S. Pat. No. 4,367,916; U.S. Pat. No. 4,445,759) and Bragg lenses (U.S. Pat. No. 4,262,996; U.S. Pat. No. 4,440,468). These lenses provide focusing in one dimension only, in the plane of the lens structure (invariably parallel to the substrate).

Another possibility is to fabricate a GRIN lens at the end face (U.S. Pat. No. 5,719,973). These lenses provide focusing in two dimensions but have cylindrical symmetry and as such are more suited to optical fibres than integrated optical waveguides (which are typically rectangular in shape).

One method for integrating a lens structure with an optical waveguide is to produce a lens-shaped protrusion on the end face of the waveguide. This may be achieved by selectively etching the cladding to leave a protruding core, then heating the waveguide material to its softening point (e g. with a $CO_2$ laser pulse) so that the angular protrusion collapses into a rounded convex lens shape. Such a structure also provides focusing in two dimensions FIGS. 2a, 2b and 2c illustrate a method for fabricating a lens, as known in the art, on the end face of an integrated optical waveguide, as described in U.S. Pat. No. 5,432,877. According to this embodiment, FIG. 2a shows the substrate 11 (e g. silicon), the lower cladding 12 and upper cladding 14 (both comprising silica doped with boron and phosphorus) and the core 13 (comprising silica doped with boron, phosphorus and germanium). The end face of the waveguide 10 is etched in a buffered hydrofluoric acid solution, which preferentially etches the cladding layers, to leave a protrusion 20 of core material. Finally, the etched waveguide is heated to approximately 1000° C. to soften the core; surface tension then shapes the protruding core to produce a substantially cone-shaped lens 21.

Such chemical etching techniques have been demonstrated for silica glass-based waveguides in U.S. Pat. No. 5,432,877 and U.S. Pat. No. 6,341,189. They are, however, limited in their applicability, relying on differential etch rates between the cladding (e.g. silica) and the core (e g. germanium-doped silica) For example, selective chemical etching generally cannot be used for polymer-based integrated optical waveguides. Furthermore, the thermal rounding process can only be used if the core material has a softening point, which excludes non-thermoplastic polymers and crystalline materials such as silicon and other semiconductors Also, the etching and softening processes must be precisely controlled if the desired lens shape is to be obtained.

A further disadvantage with chemical etching-based techniques is that the lens structures can only be prepared after the optical waveguide circuit chips have been diced (cutting or breaking into individual chips). While many chips can be collected and etched at the same time, this still requires careful handling and extra process steps.

The present invention concerns a method for fabricating an integrated optical waveguide with a unitary lens structure and with a patterned upper cladding that avoids some or all of the abovementioned disadvantages of the prior art. The unitary lens comprises a curved surface through which light is launched into free space. Since this curved surface must have an air interface, any upper cladding must be patterned such that at least this curved surface is free of contact with cladding material The unitary lens structures described in the present invention are capable of focusing light in the dimension parallel to the substrate. If focusing in the perpendicular direction is desired, an external lens such as a transverse cylindrical lens could be used. This configuration is superior to other configurations known in the art that require an external ball or GRIN lens, because these require the external lens to be accurately positioned in two dimensions. In contrast, an external transverse cylindrical lens would only need to be accurately positioned in the perpendicular direction. This is especially advantageous in devices with arrays of unitary lens structures, where one transverse cylindrical lens could be used to provide perpendicular focusing for a plurality of array elements.

A second application where it is advantageous for at least one legion of the core to be free of contact with cladding material on at least one side is an integrated optical waveguide device where light is directed around curves with small bend radii. This situation frequently arises in the design of integrated optical waveguide devices, since the footprint of a device can be reduced (and therefore more devices fabricated per substrate) by implementing tight bends. Without wishing to be bound by theory, it is well known that introducing a bend into an optical waveguide perturbs the guided modes such that they tend to leak out the side of the bend, resulting in loss of optical power. For large bend radii (i.e. gradual bends) this loss is negligible, but as the bend radius is reduced, there comes a point where the loss becomes unacceptable For a given bend radius, the loss depends on the refractive index difference between the core and cladding; if this refractive index difference is larger (i.e. the guided modes are more tightly bound), the loss is smaller. Bend-induced loss occurs for both single mode and multimode waveguides. For the multimode case, the higher order modes (which are less strongly guided) have higher bend loss (i.e. tend to be lost first).

Generally, the core-cladding refractive index difference is maximised (and hence bend loss minimised) when the core is surrounded by free space (air in practical terms), i.e. the "cladding" has a refractive index of 1. For integrated optical waveguide devices, bends usually occur in one plane only, parallel to the substrate Since bend loss only occurs in the plane of the bend (ie light leaks out through the side walls), only the side walls need to be "air clad". In particular, only that side wall on the outside of the bend needs to be air clad Referring now to FIGS. 1a and 1b: if an integrated optical waveguide device has tight bends, it would be advantageous for the upper cladding 14 to be omitted. The core 13 would then be in contact with cladding material (the lower cladding 12) only on the bottom, which in terms of bend loss is unimportant.

A disadvantage with omitting the upper cladding in planar waveguides is that the mechanical strength of the structure may be insufficient, i.e. the structure cannot be processed and handled using standard techniques. For example, dicing with a high speed saw could dislodge the core from the lower cladding. Also, bare core structures are extremely vulnerable to mechanical damage or to the formation of scattering centres by extraneous dust. For this reason, in integrated waveguide devices with tight bends, it is advantageous to pattern the upper cladding such that upper cladding material is present everywhere except in the regions surrounding the tight bends.

Similarly, in integrated waveguide devices with unitary lens structures, it is advantageous to pattern the upper cladding such that upper cladding material is present everywhere except in the legions surrounding the unitary lens structures

SUMMARY OF THE INVENTION

The first aspect of the present invention concerns integrated optical waveguides where the upper cladding is patterned such that the core is free of contact with cladding material in at least one region, on at least one side. The second aspect of the present invention describes a method for patterning an upper cladding layer As mentioned above, planar waveguides have a light transmissive elongated core region which is square or rectangular in cross section, with top and bottom faces and two sides. Such planar waveguides will also have two ends As these ends are perpendicular to the substrate, they may also be regarded for the purposes of the present invention as being sides.

According to a first aspect the invention provides a method for producing an integrated optical waveguide with a patterned upper cladding comprising the steps of:
  a) depositing a core layer onto a substrate, optionally with a lower cladding layer therebetween;
  b) patterning the core layer to provide a light transmissive element;
  c) depositing an upper cladding layer onto the light transmissive element; and
  d) patterning the upper cladding to provide at least one region in which the light transmissive element is air clad.

According to a second aspect the invention provides an integrated optical waveguide with patterned upper cladding comprising:
  a substrate;
  an optional lower cladding layer;
  a light transmissive element; and
  a patterned upper cladding having at least one air clad region.

Patterning the core layer will generally result in an uncovered portion of the substrate of lower cladding layer (where used) being present. It will be understood that in these circumstances, this uncovered portion may be recoated wholly or partially with the upper cladding when this is applied. Patterning of the upper cladding may or may not result in some portions of the substrate or lower cladding layer being uncovered.

Also, while the present invention discloses that certain side or end regions of the light transmissive portion be left unclad, those skilled in the art will understand that apart from the functional regions of interest, the light transmissive core is best clad as much as possible to avoid mechanical damage and scattering losses.

In one alternative embodiment, the light transmissive element comprises a waveguide and lens as a unitary body. Preferably, the lens has a curved surface, and the step of patterning the upper cladding is such that the curved surface is free of contact with the upper cladding material.

Alternatively, the light transmissive element comprises a waveguide with a bend. Preferably, the step of patterning the upper cladding is such that in the region of the bend, the waveguide is free from contact with the upper cladding material. More preferably the waveguide is free from contact with the upper cladding material on the side corresponding to the outside of the bend.

Preferably, the upper cladding layer comprises a polymeric material, mote preferably a thermally curable polymer. It is thus preferred that the upper cladding layer is patterned by selectively curing it with a patterned heat source and the uncured material dissolved with a solvent, whereby the cured material is insoluble in the solvent.

Alternatively, the upper cladding layer comprises a polymer curable by actinic radiation, preferably ultraviolet light. It is thus preferred that the upper cladding layer is patterned by selectively curing it with a patterned source of ultraviolet light and the uncured material dissolved with a solvent, whereby the cured material is insoluble in the solvent.

It is generally preferred that the polymer is a siloxane polymer, and it is also preferred that the substrate comprises silicon, silica, glass or polymer. Non-limiting examples of polymer substrates include: acrylic, Perspex, polymethylmethacrylate, polycarbonate, polyester, polyethyleneterephthalate and PET.

Preferably, the lower cladding and light transmissive element comprise materials selected from polymeric materials, glass and semiconductors.

More preferably, the lower cladding and light transmissive element comprise a polymer, preferably a siloxane polymer, curable by actinic radiation, most preferably ultraviolet light.

According to a third aspect the invention provides a method of fabricating an optical waveguide device with a patterned upper cladding, comprising the steps of:
a) forming a patterned blocking layer opaque to a predetermined wavelength on a portion of a substrate transparent to the predetermined wavelength;
b) depositing a core layer on said patterned blocking layer and/or on an uncovered portion of the substrate;
c) patterning the core layer from above to provide a light transmissive element;
d) depositing an upper cladding layer, which comprises a material curable by exposure to light of the predetermined wavelength on the light transmissive element, and/or on the patterned blocking layer and/or on an uncovered portion of the substrate;
e) irradiating said upper cladding layer from below with light of the predetermined wavelength, to cure those portions of said upper cladding layer not positioned above said patterned blocking layer; and
f) removing non-cured portions of said upper cladding layer According to a fourth aspect the invention provides a method of fabricating an optical waveguide device with a patterned upper cladding, comprising the steps of:
a) forming a patterned blocking layer opaque to a predetermined wavelength on a portion of a substrate transparent to the predetermined wavelength;
b) depositing a lower cladding layer on said blocking layer and/or on an uncovered portion of said substrate;
c) depositing a core layer on said lower cladding layer;
d) patterning the core layer from above to provide a light transmissive element;
e) depositing an upper cladding layer on said core layer and/or on an uncovered portion of said lower cladding, which comprises a material curable by exposure to light of the predetermined wavelength;
f) irradiating said upper cladding layer from below with light of the predetermined wavelength, to cure those portions of said upper cladding not positioned above said patterned blocking layer; and
g) removing non-cured portions of said upper cladding layer.

Preferably the patterned blocking layer is formed by screen printing. It preferably comprises a compound that absorbs light of the predetermined wavelength Preferably the upper cladding layer comprises a polymer curable by exposure to light of the predetermined wavelength, which is preferably in the ultraviolet region. Preferably the polymer is a siloxane polymer In some embodiments, it is preferred that the patterned blocking layer comprises a pattern of scattering surfaces, such as may be formed by mechanical abrasion or chemical etching, for example, wherein the scattering surfaces scatter light of the predetermined wavelength, effectively blocking transmission of said light.

It will be appreciated that when the core layer is patterned onto a substrate, an uncovered portion of substrate will usually result. Some or all of the patterned blocking layer may also be uncovered. The substrate and or blocking layer will usually be recoated with the upper cladding layer. Following photolithography with curing light passing through the substrate, the portion above the blocking layer is usually washed away. Other regions may be masked, for example by mechanical means, to leave substrate or coating layer uncovered.

It will also be appreciated that when the core layer is patterned onto a lower cladding layer, an uncovered portion of lower cladding layer will usually result. Some of all of the patterned blocking layer may also be uncovered as well as some or all of the lower cladding. The substrate, lower cladding layer and or blocking layer will usually be recoated with the upper cladding layer. Following photolithography with curing light passing through the substrate, the portion above the blocking layer is usually washed away. Other regions may be masked, for example by mechanical means, to leave substrate, lower cladding or coating layer uncovered.

According to a fifth aspect the invention provides a method of fabricating an optical waveguide device with a patterned upper cladding, comprising the steps of:
a) depositing a lower cladding layer on a substrate transparent to light of a predetermined wavelength;
b) forming a patterned blocking layer opaque to light having the predetermined wavelength on said lower cladding layer;
c) depositing a core layer on said blocking layer and/or on an uncovered portion of the lower cladding layer;
d) patterning the core layer from above to provide a light transmissive element;
e) depositing an upper cladding layer, on said light transmissive element and/or on said blocking layer and/or on said lower cladding layer, which comprises a material curable by exposure to light of the predetermined wavelength;
f) irradiating said upper cladding layer from below with light of the predetermined wavelength, to cure those portions of said upper cladding not positioned above said patterned blocking layer; and g) removing non-cured portions of said upper cladding layer.

In one alternative preferred embodiment, the invention provides a method further comprising the steps of:
i) forming a lift-off layer after forming the patterned blocking layer and before depositing the lower cladding layer; and
ii) removing the lift-off layer after removal of the non-cured portions of said upper cladding layer, to separate the lower cladding layer, light transmissive element and patterned upper cladding from the substrate.

In yet another alternative preferred embodiment, the invention provides a method further comprising the steps of:
i) forming a lift-off layer on the substrate before depositing the lower cladding layer; and
ii) removing the lift-off layer after removal of the non-cured portions of said upper cladding layer, to separate the lower cladding layer, patterned blocking layer, light transmissive element and patterned upper cladding from the substrate.

BRIEF DESCRIPTION OF THE DRAWINGS

FIGS. 1a and 1b illustrate the side and end views of the end face of a typical integrated optical waveguide as known in the art.

FIGS. 2a-c illustrate the steps involved in a selective chemical etching method for fabricating a lens structure on the end face of an integrated optical waveguide (as known in the art).

FIGS. 3a and 3b illustrate top and side views of a patterned waveguide and unitary lens structure with air cladding, and with a transverse cylindrical lens to focus the light in the perpendicular direction.

FIGS. 4a and 4b illustrate why a patterned waveguide and unitary lens structure cannot be protected with a conventional (i.e. non-patterned) upper cladding.

DETAILED DESCRIPTION OF SPECIFIC EMBODIMENTS

Figure 5A:
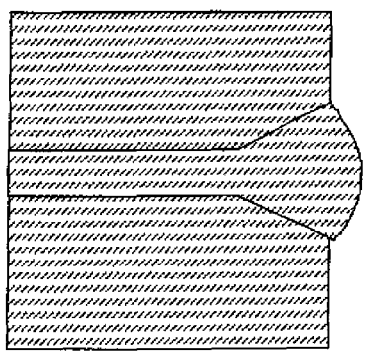
FIGS. 5a and 5b illustrate a possible but impractical method for fabricating a patterned waveguide and unitary lens structure with a conventional upper cladding.

The first aspect of the present invention concerns integrated optical waveguides where the upper cladding is patterned such that the core is free of contact with cladding material in at least one region, on at least one side. This aspect will be illustrated by two non-limiting examples: integrated optical waveguides with unitary lens structures; and integrated optical waveguides with tight bends. This aspect is best suited to integrated optical waveguides comprising polymeric materials, and photo-patternable polymers in particular, but is generally applicable to waveguides comprising a wide range of materials.

Considering first the example of patterned upper claddings for unitary lens structures, this description will concentrate on lenses for launching a collimated beam into free space. It should be understood however that this is a non-limiting case. The same unitary lens structures can equally be used to focus a collimated beam into a waveguide. Patterned upper claddings for other unitary lens structures, for example lenses to focus light from a laser diode into a waveguide, are also within the scope of the invention.

A top view of an air clad waveguide core 13 with unitary patterned lens structure 30 is shown in FIG. 3a, with a side view shown in FIG. 3b Also shown are a lower cladding 12 and a substrate 11. The unitary lens structure 30 comprises a taper region 31 and a curved surface 32. Light guided along the core 13 diverges into the taper region 31 and is collimated in the direction parallel to the substrate by refraction at the curved surface 32. Because the lens is unitary with the waveguide, there is no loss or scattering as would occur if there were an interface between the two portions. If it is required to collimate the beam in the direction perpendicular to the substrate, a transverse cylindrical lens 33 can be used to produce a beam 34 collimated in two directions. The core 13 and unitary lens structure 30 may comprise any optical material that can be patterned into the required shape. They may for example comprise germanium-doped silica deposited by flame hydrolysis and patterned by photolithography and reactive ion etching (RIE). More preferably they comprise an optically transparent polymer (deposited by spin coating for example) that can be patterned by photolithography followed by wet development in a suitable solvent. One advantage with this structure, and the photolithographic method used to fabricate it, is that the patterning is precise, limited only by the resolution of the mask used for the photolithography. In particular, the curvature of the lens can be designed specifically to produce a highly collimated output beam Alternatively, the curvature of the lens can be designed to produce a convergent beam, or to collect light emitted from a laser diode. The curvature of the lens, illustrated as the curved surface 32, can have any shape suitable for producing the required collimated or convergent beam It may for example comprise a portion of a circle, ellipse, parabola or hyperbola, or any curve generated by a polynomial equation. It may also comprise a plurality of straight segments that approximate a curved surface. In practice, the digitisation generally involved in fabricating the necessary mask for patterning the unitary lens structure means that the curved surface will be composed of a plurality of straight segments. A second advantage is that the lens can be produced before the optical waveguide circuits are diced It is desirable to provide the unitary core and/or lens with an upper cladding to protect it from mechanical damage. However the lens needs to be able to launch light directly into free space, so the curved surface 32 cannot be coveted by any cladding that might otherwise be used to protect the structure. This situation is illustrated in FIGS. 4a (top view) and 4b (side view). In this case the curved surface 32 is unable to refract the emerging light into a collimated beam; instead the light continues to diverge before being refracted into a highly divergent output 40 as it emerges from the upper cladding 14. Even if the lens were designed to launch a collimated beam into the upper cladding material, the output beam would be perturbed by any imperfections in the planarisation of the upper cladding.

Figure 6A:
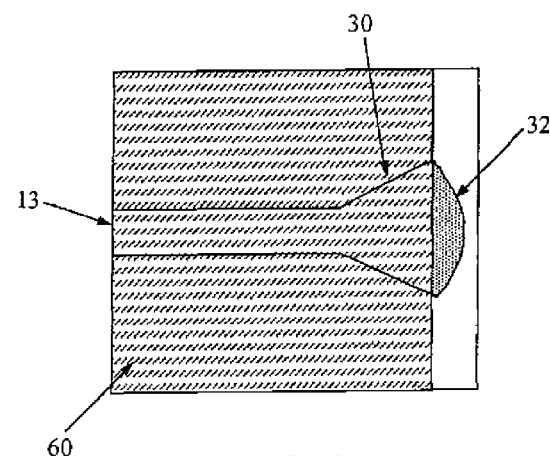
FIGS. 6a and 6b illustrate one possible method for fabricating a patterned waveguide and unitary lens structure with a patterned upper cladding.

If an upper cladding is deposited but not patterned, the necessary air inter face of the curved surface can only be restored by cutting it to shape, as shown in FIGS. 5*a* (top view) and 5*b* (side view). Although the resulting structure has good mechanical integrity, the cutting process is impractical since curved surfaces cannot be produced by conventional dicing saw or wafer cleaving methods. Furthermore, the shape and quality of the lens obtained by the cutting process would generally be inferior to that obtained by the photolithographic process described herein According to the present invention, the waveguide and unitary lens structure can be protected and the lens/air interface preserved by using a patterned upper cladding. One possible non-limiting configuration for a unitary lens structure with patterned upper cladding is shown in FIGS. 6*a* (top view) and 6*b* (side view). As before, the core 13 and unitary lens structure 30 may comprise any optical material that can be patterned into the required shape. Preferably they comprise an optically transparent polymer (deposited by spin coating for example) that can be patterned by photolithography followed by wet development in a suitable solvent. However any other optical material, such as glass or a semiconductor, could be used for the core and unitary lens structure, patterned using RIE for example.

After the core 13 and unitary lens structure 30 have been formed, a photo-patternable polymer can be spin coated over them By masking the section of uncured polymer above the curved surface 32, the remainder of the polymer can be cured by exposure to actinic radiation in a photolithographic process. The masked (i.e. uncured) region of polymer can then be dissolved away with a suitable solvent, for example acetone or isopropanol, resulting in a patterned upper cladding 60. In this configuration, the upper cladding edge 61 may be positioned at any point back from the taper/curved surface 62 It may for example be positioned in the vicinity of the core/taper vertex 63.

Preferably, the polymer contains cross-linkable functions, such as carbon-carbon double bonds or epoxide groups, that can be cross-linked by exposure to actinic radiation, thereby rendering the material insoluble in the chosen solvent Preferably, the actinic radiation is UV light, although ionising radiation such as X-rays or an electron beam may also be suitable Since it is not necessary to have high resolution in this photolithographic process, thermal activation of the cross-linking process, for example via a masked $CO_2$ laser, may also be applicable.

A photo-patternable polymer is particularly preferred for the patterned upper cladding because of the ease and mild conditions (e.g. UV exposure followed by solvent development) by which it can be patterned. Of the various optical materials that could be used for the underlying structures (core, unitary lens structure and lower cladding), almost all (including glass, semiconductors and cross-linked polymers) will be undamaged by the low levels of UV light used for photolithography, or by the solvent used for development. This may not be the case with other patterning techniques, such as RIE. In this instance, one would have to use an upper cladding material that was etched much more rapidly than the other materials. Alternatively one could employ etch stop barrier layers, but at the cost of many additional process steps.

One particularly suitable material for a patterned upper cladding is a UV curable siloxane polymer, synthesised fbi example by a condensation reaction as disclosed in the U.S. patent application Ser. No 10/308,562. Siloxane polymers have excellent adhesion to a variety of materials, and are well suited as a general purpose upper cladding. A photoinitiator or thermal initiator may be added to increase the rate of curing. Examples of commercially available photoinitiators include 1-hydroxy-cyclohexyl-phenyl-ketone (Irgacure 184), 2-methyl-1[4-methylthio)phenyl]-2-morpholinopropan-1-one (Irgacure 907), 2,2-dimethoxy-1,2-diphenylethan-1-one (Irgacure 651), 2-benzyl-2-dimethylamino-1-(4-morpholinophenyl)-butanone-1 (Irgacure 369), 4-(dimethylamino) benzophenone, 2-hydroxy-2-methyl-1-phenyl-propan-1-one (Darocur 1173), benzophenone (Darocur BP), 1-[4-(2-hydroxyethoxy)-phenyl]-2-hydroxy-2-methyl-1-propane-1-one (Irgacure 2959), 4,4'-bis(diethylamino) benzophenone (DEAB), 2-chlorothioxanthone, 2-methylthioxanthone, 2-isopropylthioxanthone, benzoin and 4,4'-dimethoxybenzoin. For curing with visible light, the initiator may for example be camphorquinone. A mixture of two or more photoinitiators may also be used For example, Irgacure 1000 is a mixture of 80% Darocur 1173 and 20% Irgacure 184. For thermal curing, organic peroxides in the form of peroxides (e.g. dibenzoyl peroxide), peroxydicarbonates, peresters (t-butyl perbenzoate), perketals, hydroperoxides, as well as AIBN (azobisisobutyronitrile), may be used as initiators The patterning technique preferred in the present invention, that of photolithographic patterning and wet development of polymers can thus be seen to be different in principle from the chemical etching techniques previously described in the art. Both involve selective removal of a portion of material, however in the case of chemical etching, the selectivity is based on a chemical reaction (different compositions have differing reaction rates with the etchant), whereas in the photolithogiaphic/wet development method preferred for the present invention, selectivity is based on a physical process (polymers with different degrees of cross-linking have differing solubilities).

Figure 6B:
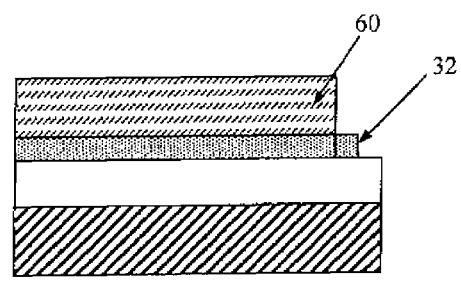
Figure 7A:
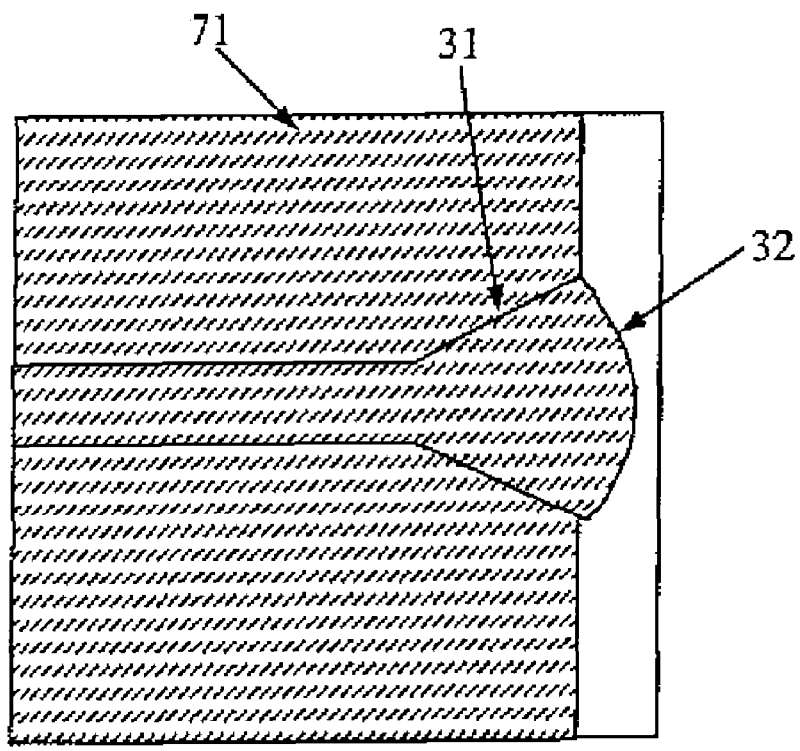
FIGS. 7a and 7b illustrate another possible method for fabricating a patterned waveguide and unitary lens structure with a patterned upper cladding.

Another non-limiting configuration for a unitary lens structure with patterned upper cladding is shown in FIGS. 7*a* (top view) and 7*b* (side view). In this configuration, the upper cladding 71 is patterned so as to cover the entire taper region 31 and maintain the air interface of the curved surface 32. The same materials and patterning techniques as described above in relation to FIGS. 6*a* and 6*b* could be employed for this configuration, and again a UV curable siloxane polymer is particularly preferred as the upper cladding material. Selectivity between the core/lens and upper cladding materials is not required in this configuration. Patterning could therefore be done by RIE or more preferably by UV-induced cross-linking followed by solvent development Once the upper cladding has been patterned, the desired integrated optical waveguide device may be obtained by dicing arbitrarily close to the curved surface of the lens. The dicing direction will usually be perpendicular to the direction of propagation along the core, but other dicing directions may be used depending on the device and application. The device may contain one or more arrays of unitary lens structures, in which case it is advantageous to position the lenses in each array parallel to each other for ease of dicing.

Figure 8:
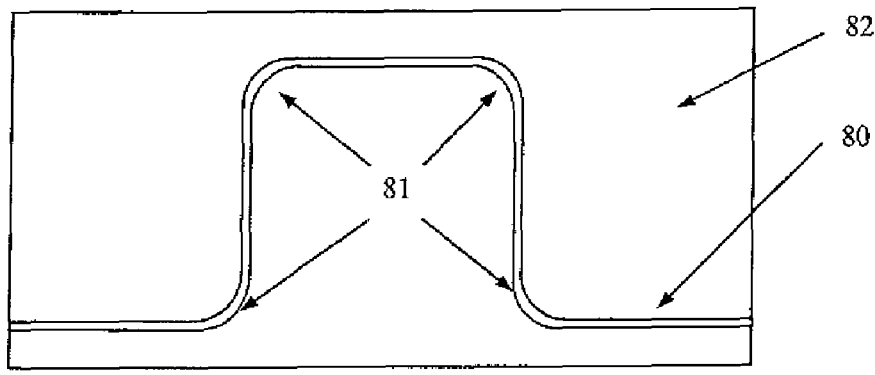
FIG. 8 illustrates a top view of an integrated optical waveguide with tights bends and with the upper cladding omitted

Considering now the example of integrated optical waveguides with tight bends, FIG. 8 illustrates the top view of an integrated optical waveguide 80 with tight bends 81 and with the upper cladding omitted 82 (i.e. air clad). This configuration is known in the art and has the advantage of low bend loss because the core/cladding refractive index difference is maximised in the plane of the bends, but the disadvantages of low mechanical strength and susceptibility to scattering loss.

Figure 9:
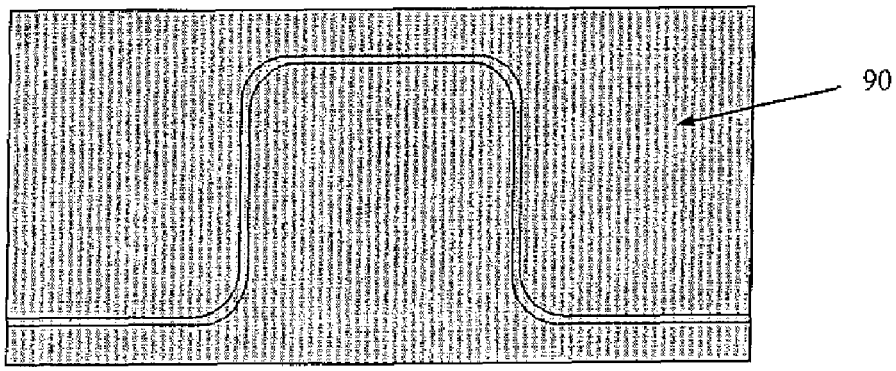
FIG. 9 illustrates a top view of an integrated optical waveguide with tights bends and with an upper cladding.

FIG. 9 illustrates the top view of an integrated optical waveguide with tight bends and with an upper cladding 90. This configuration is known in the art and has the advantages of good mechanical strength and low scattering loss but the disadvantage of high bend loss, since the difference between the refractive indices of the core material and upper cladding material is insufficient to prevent excessive leakage of light through the core/cladding interface on the outside of the bends.

Figure 10:
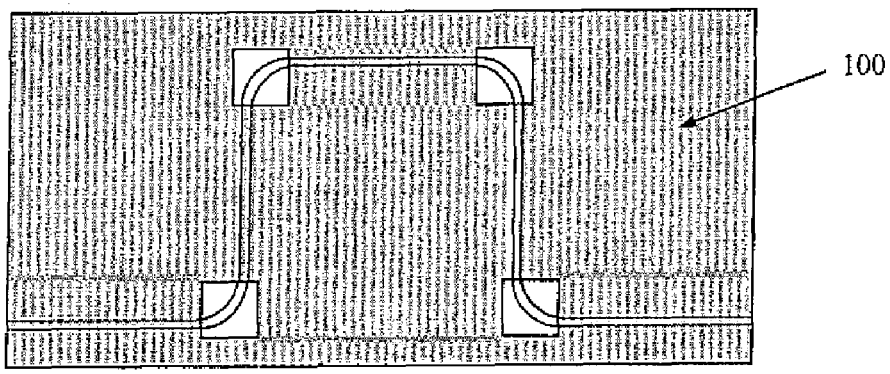
FIG. 10 illustrates a top view of an integrated optical waveguide with tights bends and with a patterned material/air upper cladding.
Figure 11A:
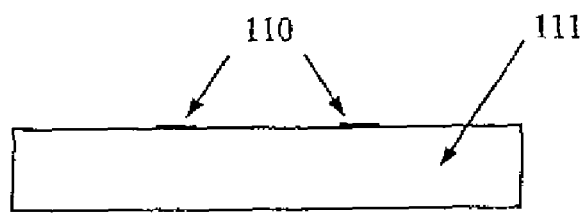
FIGS. 11a-h illustrate a method for providing a waveguide structure with a patterned upper cladding.
Figure 11B:
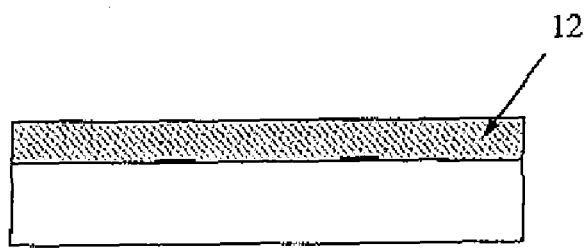
Figure 11C:
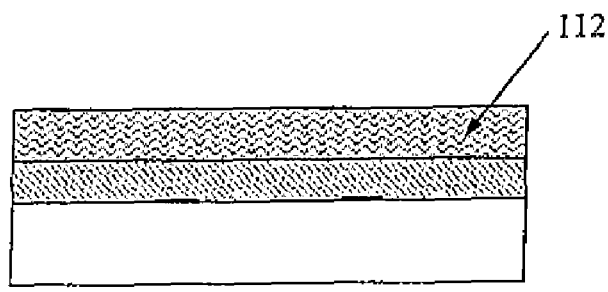
Figure 11D:
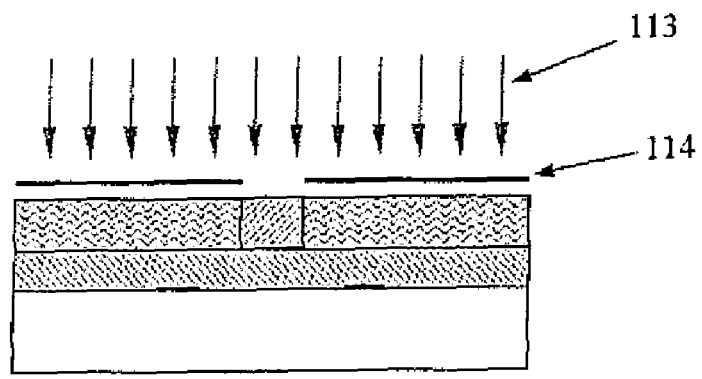
Figure 11E:
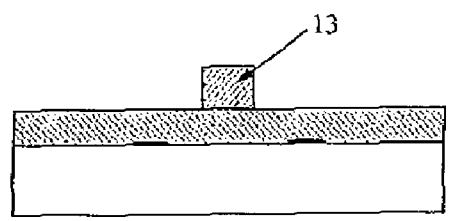
Figure 11F:
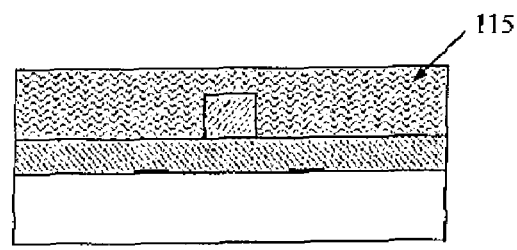
Figure 11G:
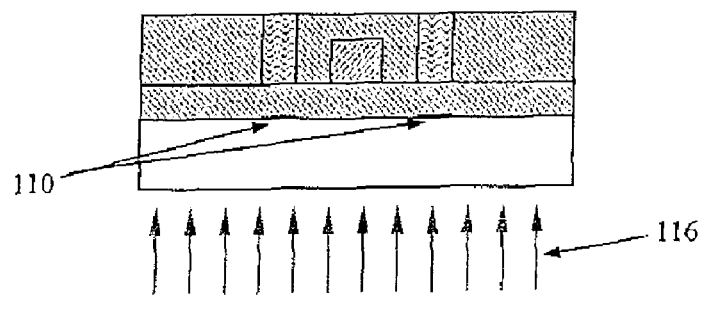
Figure 11H:
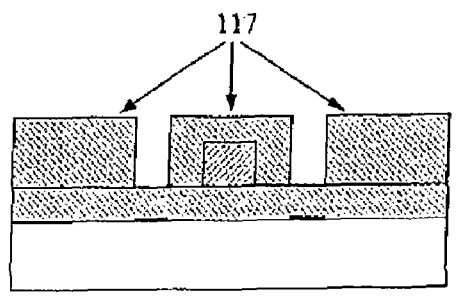

FIG. 10 illustrates the top view of an integrated optical waveguide with tight bends and with a patterned material/air upper cladding 100, such that the upper cladding material is absent around those regions of the core with tight bends. This inventive configuration combines the advantages of good mechanical strength, low scattering loss and low bend loss. In FIG. 10, the upper cladding has been patterned such that in those regions of the core with tight bends, the upper cladding is absent from the top surface and the side walls both on the inside and outside of the bends. Note that it is only necessary for the upper cladding to be absent from the side wall on the outside of the bend.

It should be noted that the inventive configuration shown in FIG. 10 introduces transition losses as the guided modes propagate from a material clad region into an air clad region and back into a material clad region. Those skilled in the art will appreciate that to make best use of the inventive configuration, one must balance this transition loss against the minimisation of bend loss.

As for the unitary lens example, the core and upper cladding layers may comprise any optical material that can be patterned into the required shape. Preferably they each comprise an optically transparent polymer (deposited by spin coating for example) that can be patterned by photolithography followed by wet development in a suitable solvent.

Figure 5B:
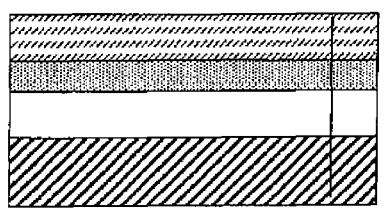
Figure 7B:
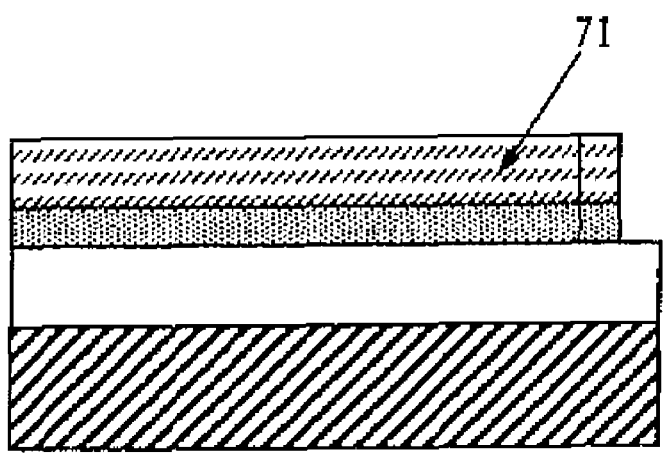

For the "conformal" upper claddings disclosed in U.S. Pat. No. 6,555,288, FIGS. 7A and 7B (of that disclosure) show that the upper cladding is patterned by a conventional photolithographic/wet development process (i.e. exposure from above to actinic radiation through a mask, followed by solvent development), in the same manner as the core (as shown in FIGS. 4 and 5 of that disclosure). In this method previously described in the art, the patterned exposure (i.e. actinic radiation through a mask) can be performed with a variety of imaging tools, for example a mask aligner, scanning projection aligner or stepper. Either way, the method requires an imaging tool to be used twice, once for the core and once for the upper cladding The same imaging tool could be used for both exposures, in which case the time taken to produce the optical device is increased, or two imaging tools could be used, with greater plant expense. In general, however, an upper cladding does not need to be patterned with the same degree of spatial accuracy as a waveguide core. For example, the positioning of the upper cladding with respect to the core in FIG. 7B of U.S. Pat. No. 6,555,288, the positioning of the upper cladding with respect to the unitary lens structure in FIG. 6, or the positioning of the upper cladding with respect to the bends in FIG. 10, is not critical. Note that this is not the case with the unitary lens structure of FIG. 7 of the present application, where the patterned upper cladding has to be in perfect registration with the curved surface For this reason, the configuration shown in FIG. 6 is preferred for the unitary lens structure with patterned top cladding.

In an alternative to the method previously described in the art, the upper cladding could be patterned by exposure to actinic radiation from beneath, through a transparent substrate. One possible means for performing this patterning technique, using UV-curable polymer materials, and which forms the second aspect of the present invention, is illustrated in FIGS. 11a to 11h. An upper cladding mask pattern 110 is deposited, for example by screen printing, onto a substrate 111 transparent to the UV light used for curing the upper cladding. Suitable substrate materials include quartz, fused silica, glass and polymer. Non-limiting examples of polymer substrates include: acrylic, Perspex, polymethylmethacrylate, polycarbonate, polyester, polyethyleneterephthalate and PET. A lower cladding layer 12 is spin coated onto the substrate and cured from above with UV light. A core layer 112 is spin coated onto the cured lower cladding layer, patterned by exposure to UV light 113 from above through a mask 114, and developed with a solvent to leave waveguide core 13 An upper cladding layer 115 is spin coated over the waveguide core, patterned by exposure to UV light 116 from below through the upper cladding mask pattern 110 and developed with a solvent to leave patterned upper cladding 117 The patterned upper cladding 117 is an arbitrary structure used to exemplify the inventive technique.

The inventive technique described above is non-limiting, and there are several possible variations. The upper cladding mask pattern 110 could be screen printed onto the lower cladding layer rather than onto the substrate. In this case the actinic radiation does not pass through the lower cladding layer, which is advantageous if sharp boundaries in the patterned upper cladding are required (limited by diffraction). In another variation, since the substrate is transparent, the lower cladding layer 12 may be omitted (so long as the refractive index of the substrate is less than that of the core). In yet another variation, the upper cladding mask pattern 110 could be printed using photolithography, although this requires an imaging tool and obviates the primary advantage of the inventive technique.

The upper cladding mask pattern 110 can be composed of any material that absorbs the actinic radiation (usually UV light) used to pattern the upper cladding. It may for example be composed of a metal such as aluminium or a pigment that absorbs UV light. Preferably, it is composed of a pigment, dye or metallic paint that is suitable for screen printing. More preferably, it is composed of a material that strongly absorbs UV light but not the light guided in the core layer (usually in the near infrared). Such materials, such as compounds with conjugated carbon-carbon double bonds and/or aromatic rings, are common and well known in the art. This is a highly advantageous property since the upper cladding mask pattern 110 is left in situ.

In yet another variation, a reverse mask pattern could be screen printed onto the transparent substrate, and the uncoated surface regions roughened for example by sandblasting or etching (e.g. with hydrofluoric acid if the substrate is fused silica). The reverse mask pattern could then be removed, e.g. with a solvent, to leave the desired upper cladding mask as a pattern of roughened features that will scatter (and effectively block) the actinic radiation "Irradiation from below" schemes are known for patterning core layers (U.S. Pat. No. 5,352,566; U.S. Pat. No. 6,037,105; U.S. Pat. No. 6,256,441), but not for patterning upper cladding layers. The schemes disclosed in U.S. Pat. No. 6,037,105 and U.S. Pat. No. 6,256,441 are virtually identical, involving upper cladding mask patterns deposited on the lower cladding, for patterning a UV-curable core layer. In U.S. Pat. No. 6,037,105, the "irradiation from below" scheme is used to prevent contamination of the core layer caused by contact with a photomask, while in U.S. Pat. No. 6,256,441 it is used to provide highly accurate core patterns. In contrast, the object of the inventive scheme for patterning upper cladding layers from below is to reduce the number of fabrication steps required, in particular those steps involving an imaging tool The "irradiation from below" scheme for core patterning disclosed in U.S. Pat. No. 5,352,566 is distinct in many respects, involving positive photoresist layers and reactive ion etching steps.

In yet another possible variation of the inventive upper cladding patterning technique, a lift-off layer can be inserted between the substrate and the lower cladding layer and/or the upper cladding mask pattern. After the core and upper cladding layers have been patterned, the lift-off layer can then be removed to separate the lower cladding, patterned core and upper cladding layers from the substrate. This variation is particularly preferred if a flexible, all polymer waveguide assembly is required. Another advantage of this variation is that it enables the upper cladding mask pattern to be removed. The lower cladding may comprise a combination of an additional flexible polymer substrate material and deposited optical quality cladding material, and the upper cladding mask layer can be formed on any one of several layers (transparent substrate, lift-off layer, optional flexible polymer substrate or lower cladding). A similar lift-off layer scheme is disclosed in U.S. Pat. No. 6,256,441, but in this disclosure it is the core layer that is patterned from below, not the upper cladding.

It should be noted that the inventive method for patterning an upper cladding by exposure from below is applicable to any patterned upper cladding, not merely to the inventive patterned upper claddings of the present invention, where the upper cladding layer is patterned such that in at least one region, at least one side of the core is free of contact with the upper cladding material For example the inventive method may be used to pattern the "conformal" upper claddings disclosed in U.S. Pat. No. 5,850,498 and U.S. Pat. No. 6,555,288.

Example 1

Following the procedure disclosed in U.S. patent application Ser. No. 10/308,562, a lower refractive index polymer A was prepared with a viscosity of 2500 cP (at 20° C.) and a refractive index (measured at 20° C. on an Abbé refractometer with room light) of 1.483 A higher refractive index polymer B was prepared with a viscosity of 2200 cP (at 20° C.) and a refractive index of 1.509 (at 20° C.). A suitable photoinitiator was added to both polymer A and polymer B.

Polymer A was spin coated onto a silicon wafer and cured with UV light from a mercury lamp, to form a lower cladding layer 20 µm thick and with a refractive index of 1.478 (at 20° C. and 1550 nm). Polymer B was spin coated onto the lower cladding, and patterned with UV light through a mask; the unexposed polymer B material was then dissolved in isopropanol to form a core and unitary lens structure as shown in FIG. 3a. The core was 8 µm wide and 15 µm high, and had a refractive index of 1.505 (at 20° C. and 1550 nm). Finally, polymer A was spin coated and patterned with UV light through a mask; the unexposed polymer A material was then dissolved in isopropanol to form a patterned upper cladding as shown in FIG. 6a.

Figure 12:
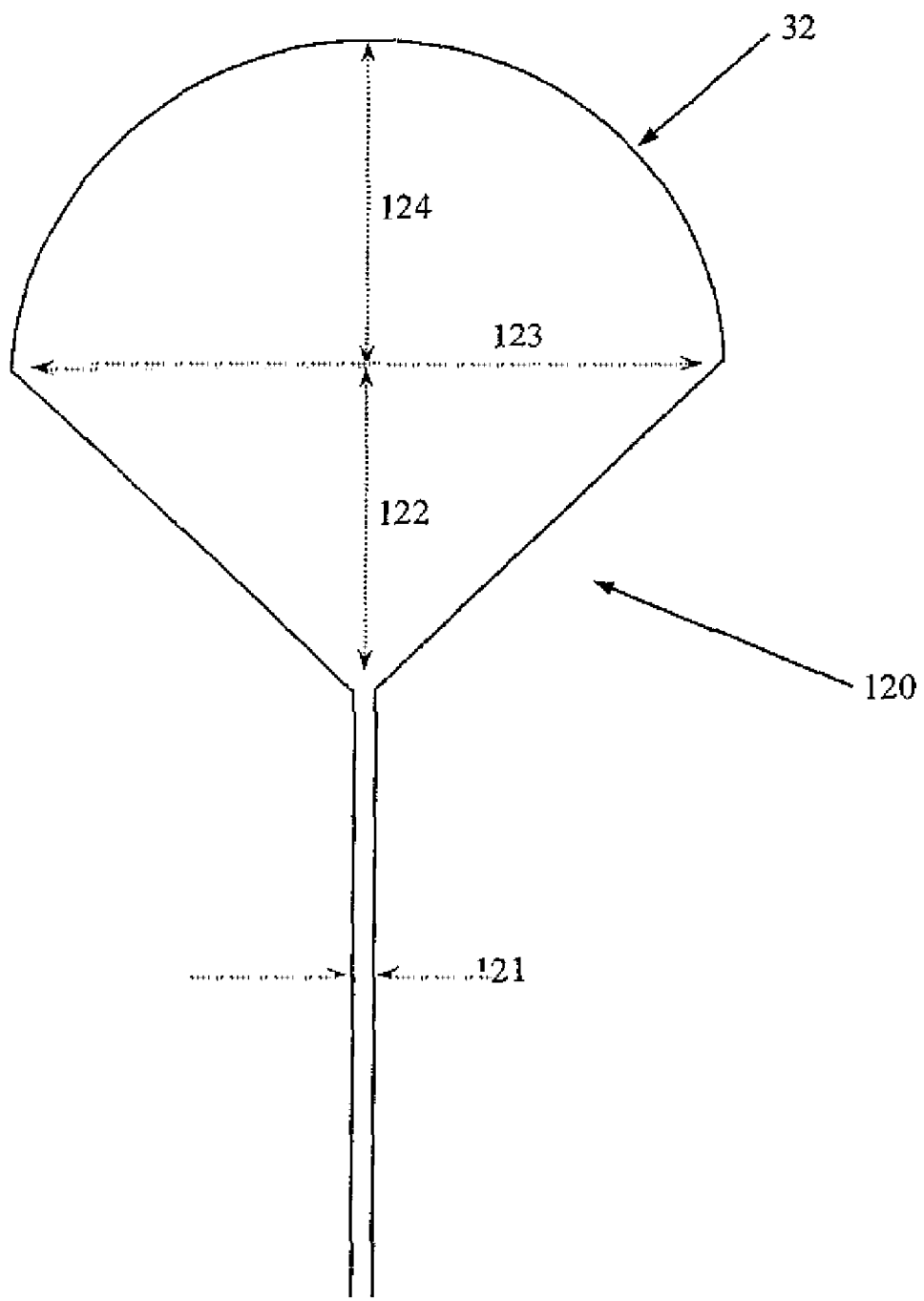
FIG. 12 illustrates the dimensions of a waveguide core with unitary lens structure used to produce a collimated output.

FIG. 12 illustrates the dimensions of one particular waveguide core with unitary lens structure 120. In this case, the width 121 of the waveguide core is 8 µm, the length 122 of the taper section is 580 µm, the end width 123 of the taper section is 850 µm, and the curved surface 32 is a parabola defined such that it extends a distance 124 from the end of the taper equal to 550 µm. For light of wavelength 850 nm guided in the core, this unitary lens structure will produce a collimated output beam with an approximate width of 850 µm in the direction parallel to the substrate Example 2

Polymer A from Example 1 was spin coated onto a silicon wafer and cured with UV light from a mercury lamp, to form a lower cladding layer 20 µm thick and with a refractive index of 1 478 (at 20° C. and 1550 nm). Polymer B from Example 1 was spin coated onto the lower cladding, and patterned with UV light through a mask; the unexposed polymer B material was then dissolved in isopropanol to form a core with four tight bends as shown in FIG. 8. The core was 8 µm wide and 15 µm high, and had a refractive index of 1.505 (at 20° C. and 1550 nm). Finally, polymer A was spin coated over the core and patterned with UV light through a mask; the unexposed polymer A material was then dissolved in isopropanol to form a patterned upper cladding as shown in FIG. 10.

Example 3

Polymer A was meniscus coated onto an acrylic substrate (Perspex, or polymethylmethacrylate), and cured with UV light from a mercury lamp, to form a lower cladding layer 10 µm thick and with a refractive index of 1.478 (at 20° C. and 1550 nm). Polymer B was meniscus coated onto the lower cladding, and patterned with UV light using a scanning projection aligner; the unexposed polymer B material was then dissolved in isopropanol to form a core and unitary lens structure as shown in FIG. 3a. The core was 8 µm wide and 20 µm high, and had a refractive index of 1.505 (at 20° C. and 1550 nm). Finally, polymer A was meniscus coated over the core and patterned with a scanning projection aligner; the unexposed polymer A material was then dissolved in isopropanol to form a patterned upper cladding as shown in FIG. 6a.

Example 4

A polyvinylalcohol (PVA) release layer was spin coated onto a glass wafer. A photocurable polymer, Norland NOA65, was spin coated and cured with UV light from a mercury lamp to give a 100 µm thick layer. Polymer A was then spin coated and cured with UV light from a mercury lamp, to form a lower cladding layer 10 µm thick and with a refractive index of 1.478 (at 20° C. and 1550 nm). Polymer B was spin coated onto the lower cladding, and patterned with UV light using a mask aligner; the unexposed polymer B material was then dissolved in isopropanol to form a core and unitary lens structure as shown in FIG. 3a. The core was 8 µm wide and 10 µm high, and had a refractive index of 1.505 (at 20° C. and 1550 nm). Polymer A was spin coated over the core and patterned with a mask aligner; the unexposed polymer A material was then dissolved in isopropanol to form a patterned upper cladding as shown in FIG. 6a. The coated wafer was then inserted into water to dissolve the PVA layer and a free-standing polymer film containing the waveguides with an uncovered lens was released from the wafer. Excess polymer film was removed to give the desired waveguide on a free-standing plastic substrate.

Example 5

A masking layer of UV-absorbing dye was screen printed onto a fused silica substrate, to covet those regions where the upper cladding material is to be removed to form the patterned upper cladding shown in FIG. 6a. As in Example 1, polymer A was spin coated and cured to form a lower cladding layer, and polymer B was spin coated, patterned with UV light and developed with isopropanol to form a core and lens structure as shown in FIG. 3a. Polymer A was then spin coated and cured by UV light from below, with the desired pattern transferred through the UV-absorbing dye masking layer. The unexposed polymer A material was then dissolved in isopropanol to form a patterned upper cladding as shown in FIG. 6a Example 6

A masking layer of UV-absorbing dye was screen printed onto an acrylic substrate (Perspex, or polymethylmethacrylate), to cover those regions where the upper cladding material is to be removed to form the patterned upper cladding shown in FIG. 6a.

Polymer A was meniscus coated onto the substrate and cured with UV light from a mercury lamp, to form a lower cladding layer 10 μm thick and with a refractive index of 1.478 (at 20° C. and 1550 nm). Polymer B was meniscus coated onto the lower cladding, and patterned with UV light using a scanning projection aligner; the unexposed polymer B material was then dissolved in isopropanol to form a core and unitary lens structure as shown in FIG. 3a. The core was 8 μm wide and 15 μm high, and had a refractive index of 1.505 (at 20° C. and 1550 nm). Polymer A was then spin coated and cured by UV light from below, with the desired pattern transferred through the UV-absorbing dye masking layer. The unexposed polymer A material was then dissolved in isopropanol to form a patterned upper cladding as shown in FIG. 6a.

What is claimed is:

1. A method for producing an integrated optical waveguide with a patterned upper cladding comprising the steps of:
   a) depositing a core layer onto a substrate;
   b) patterning the core layer to provide a light transmissive element wholly on the substrate, wherein the light transmissive element comprises a waveguide and lens;
   c) depositing an upper cladding layer onto the light transmissive element, wherein the upper cladding layer comprises a radiation-curable polymeric material; and
   d) patterning the upper cladding layer by selective exposure to curing radiation to provide at least one region in which the light transmissive element is air clad, wherein the upper cladding patterning process does not further pattern the waveguide or lens, and the lens has an air clad curved surface.

2. A method according to claim 1, additionally comprising the step of:
   e) depositing a lower cladding layer onto the substrate, prior to depositing said core layer onto said substrate.

3. A method according to claim 1, wherein the radiation-curable polymeric material comprises a thermally curable polymer.

4. A method according to claim 3, wherein the thermally curable polymer is a siloxane polymer.

5. A method according to claim 1, wherein the radiation-curable polymeric material comprises a polymer curable by actinic radiation.

6. A method according to claim 5, wherein the actinic radiation is ultraviolet light.

7. A method according to claim 5, wherein the polymeric material is a siloxane polymer.

8. A method according to claim 1, wherein the upper cladding layer is patterned by selective curing with a patterned heat source and uncured material dissolved with a solvent, whereby cured material is insoluble in the solvent.

9. A method according to claim 1, wherein the upper cladding layer is patterned by selective curing with a patterned source of ultraviolet light and uncured material dissolved with a solvent, whereby cured material is insoluble in the solvent.

10. A method according to claim 1, wherein the substrate comprises silicon, quartz, fused silica, glass, or a polymeric material.

11. A method according to claim 10, wherein the polymeric material comprises an acrylate, Perspex, polymethylmethacrylate, polycarbonate, polyester, polyethyleneterephthalate or PET.

12. A method according to claim 1, wherein the light transmissive element comprises materials selected from polymeric materials, glass and semiconductors.

13. A method according to claim 12, wherein the polymeric materials comprise a polymer curable by actinic radiation.

14. A method according to claim 13, wherein the actinic radiation is ultraviolet light.

15. A method according to claim 13, wherein the polymeric material is a siloxane polymer.

16. A method according to claim 2, wherein the lower cladding layer comprises materials selected from polymeric materials, glass and semiconductors.

17. A method according to claim 16, wherein the polymeric materials comprise a polymer curable by actinic radiation.

18. A method according to claim 17, wherein the actinic radiation is ultraviolet light.

19. A method according to claim 17, wherein the polymeric material is a siloxane polymer.

20. A method for producing an integrated optical waveguide with a patterned upper cladding comprising the steps of:
   a) depositing a core layer onto a substrate;
   b) patterning the core layer to provide a light transmissive element, wherein the light transmissive element comprises a waveguide with a bend that changes the direction of the waveguide;
   c) depositing an upper cladding layer onto the light transmissive element, wherein the upper cladding layer comprises a polymeric material; and
   d) patterning the upper cladding layer to provide at least one region in which the light transmissive element is air clad, wherein the upper cladding patterning process does not further pattern the waveguide, and the waveguide has an air clad side surface in the region of the bend.

21. A method according to claim 20, additionally comprising the step of:
   e) depositing a lower cladding layer onto the substrate, prior to depositing said core layer onto said substrate.

22. A method according to claim 20, wherein the waveguide has an air clad surface on the side corresponding to the outside of the bend.

23. A method according to claim 20, wherein the polymeric material comprises a thermally curable polymer.

24. A method according to claim 23, wherein the thermally curable polymer is a siloxane polymer.

25. A method according to claim 20, wherein the polymeric material comprises a polymer curable by actinic radiation.

26. A method according to claim 25, wherein the actinic radiation is ultraviolet light.

27. A method according to claim 25, wherein the polymeric material is a siloxane polymer.

28. A method according to claim 20, wherein the upper cladding layer is patterned by selective curing with a patterned heat source and uncured material dissolved with a solvent, whereby cured material is insoluble in the solvent.

29. A method according to claim 20, wherein the upper cladding layer is patterned by selective curing with a patterned source of ultraviolet light and uncured material dissolved with a solvent, whereby cured material is insoluble in the solvent.

30. A method according to claim 20, wherein the substrate comprises silicon, quartz, fused silica, glass, or a polymeric material.

31. A method according to claim 30, wherein the polymeric material comprises an acrylate, Perspex, polymethylmethacrylate, polycarbonate, polyester, polyethyleneterephthalate or PET.

32. A method according to claim 20, wherein the light transmissive element comprises materials selected from polymeric materials, glass and semiconductors.

33. A method according to claim 32, wherein the polymeric materials comprise a polymer curable by actinic radiation.

34. A method according to claim 33, wherein the actinic radiation is ultraviolet light.

35. A method according to claim 33, wherein the polymeric material is a siloxane polymer.

36. A method according to claim 21, wherein the lower cladding layer comprises materials selected from polymeric materials, glass and semiconductors.

37. A method according to claim 36, wherein the polymeric materials comprise a polymer curable by actinic radiation.

38. A method according to claim 37, wherein the actinic radiation is ultraviolet light.

39. A method according to claim 37, wherein the polymeric material is a siloxane polymer.

40. A method for producing an integrated optical waveguide with a patterned upper cladding comprising the steps of:
   a) depositing a core layer onto a substrate;
   b) patterning the core layer to provide a light transmissive element wholly on the substrate;
   c) depositing an upper cladding layer onto the light transmissive element, wherein the upper cladding layer comprises a radiation-curable polymeric material; and
   d) patterning the upper cladding layer by selective exposure to curing radiation to provide at least one region in which the light transmissive element is air clad; wherein the step of patterning the upper cladding layer does not pattern the light transmissive element.

41. A method according to claim 40, wherein the light transmissive element comprises a waveguide and lens, and the lens has an air clad curved surface.

42. A method according to claim 40, wherein the light transmissive element comprises a waveguide with a bend that changes a direction of the waveguide, and the waveguide has an air clad surface in the region of the bend.

43. A method for producing an integrated optical waveguide with a patterned upper cladding comprising the steps of:
   a) depositing a core layer onto a substrate;
   b) patterning the core layer to provide a light transmissive element wholly on the substrate;
   c) depositing an upper cladding layer onto the light transmissive element, wherein the upper cladding layer comprises a polymeric material; and
   d) patterning the upper cladding layer such that the light transmissive element is air clad on a side perpendicular to a surface of the substrate that is parallel to a bottom surface of the core; wherein the light transmissive element is not patterned by the step of patterning the upper cladding layer.

44. A method according to claim 43, wherein the light transmissive element comprises a waveguide and lens, and the lens has an air clad curved surface.

45. A method according to claim 43, wherein the light transmissive element comprises a waveguide with a bend that changes a direction of the waveguide, and the waveguide has an air clad surface in the region of the bend.

* * * * *